(12) United States Patent
Fabbri et al.

(10) Patent No.: US 6,431,786 B2
(45) Date of Patent: Aug. 13, 2002

(54) COUPLING MEANS BETWEEN A THERMAL MOTOR SHAFT AND A RECIPROCATING PUMP SHAFT

(75) Inventors: Fabrizio Fabbri; Maurizio Magri, both of Modena (IT)

(73) Assignee: Annovi Reverberi S.p.A., Modena (IT)

( * ) Notice: Subject to any disclaimer, the term of this patent is extended or adjusted under 35 U.S.C. 154(b) by 0 days.

(21) Appl. No.: 09/782,145

(22) Filed: Feb. 14, 2001

(30) Foreign Application Priority Data

Feb. 16, 2000 (IT) ........................................ RE000006 U

(51) Int. Cl.[7] .............................. B25G 3/28; F16B 2/14; F16B 2/18; F16B 7/04
(52) U.S. Cl. .................................. 403/359.1; 403/374.1
(58) Field of Search ............................. 403/374.1, 375, 403/356, 355, 359.1, 361, 345; 123/198 C; 415/216.1, 200, 213.1, 215.1, 214.1, 912; 416/244 R; 417/423.14, 423.15, 423.6, 423.1

(56) References Cited

U.S. PATENT DOCUMENTS

| 5,551,389 A | 9/1996 | Kahrs et al. | |
| 6,071,074 A | * 6/2000 | Morando | 415/216.1 |

FOREIGN PATENT DOCUMENTS

| EP | 0 800 012 | 10/1997 |
| GB | 2 313 652 | 12/1997 |

* cited by examiner

Primary Examiner—Christopher J. Novosad
(74) Attorney, Agent, or Firm—Browdy and Neimark

(57) ABSTRACT

An intermediate sleeve (30) to be rigidly connected to the end of the motor shaft (11) is provided, having an inner surface (32) of frusto-conical shape adapted to fit the frusto-conical surface (12) of the motor shaft (11), and a cylindrical outer surface (31), and having at least one rib (33), projecting radially from the cylindrical outer surface (31) and positioned to the side thereof; the end of the pump shaft (21) possesses an axial cavity (22) having a cylindrical surface (23) adapted to engage as an exact fit the outer surface (31) of the sleeve (30), and has at least one projecting axial element (25), arranged to lie axially alongside said rib (33) of the intermediate sleeve (30), and to interfere therewith during rotation. There is also provided an intermediate ring (40), which fits onto that axial portion of the sleeve (30) involving the at least one rib (33) and has an annular cavity which surrounds the outer surface of the sleeve (30) and is divided into at least two separate sectors (43a, 43b) by radial baffles (44), of which a first sector (43a) is arranged to receive the at least one rib (33) of the sleeve (30) as an exact fit, and the second sector (43b) is arranged to receive the axial element (25) as an exact fit.

4 Claims, 3 Drawing Sheets

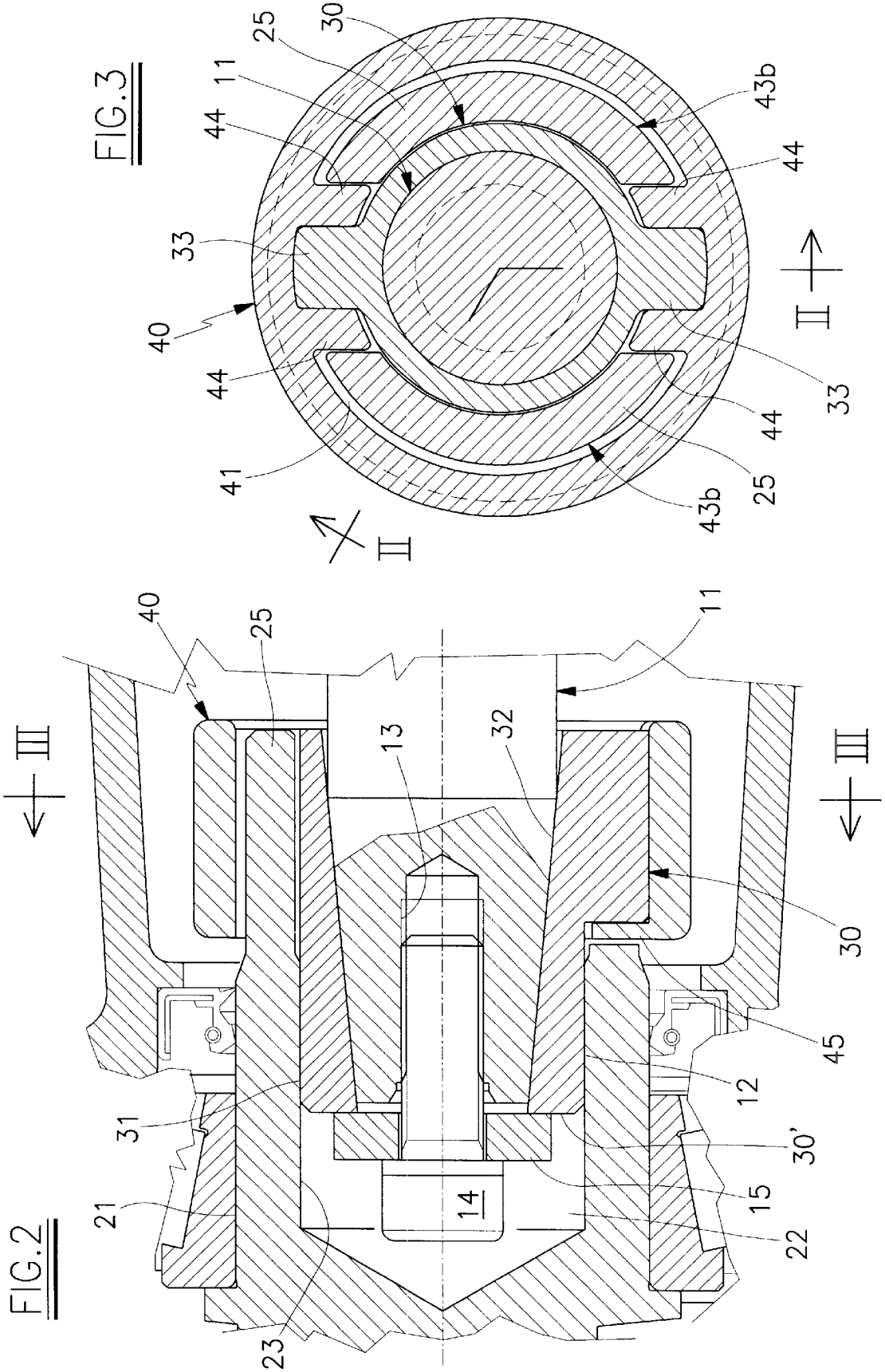

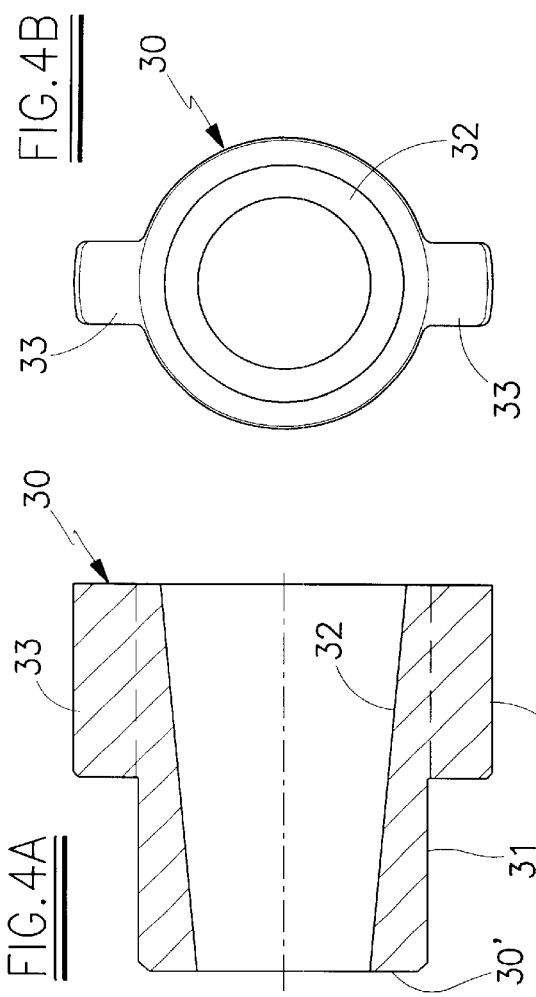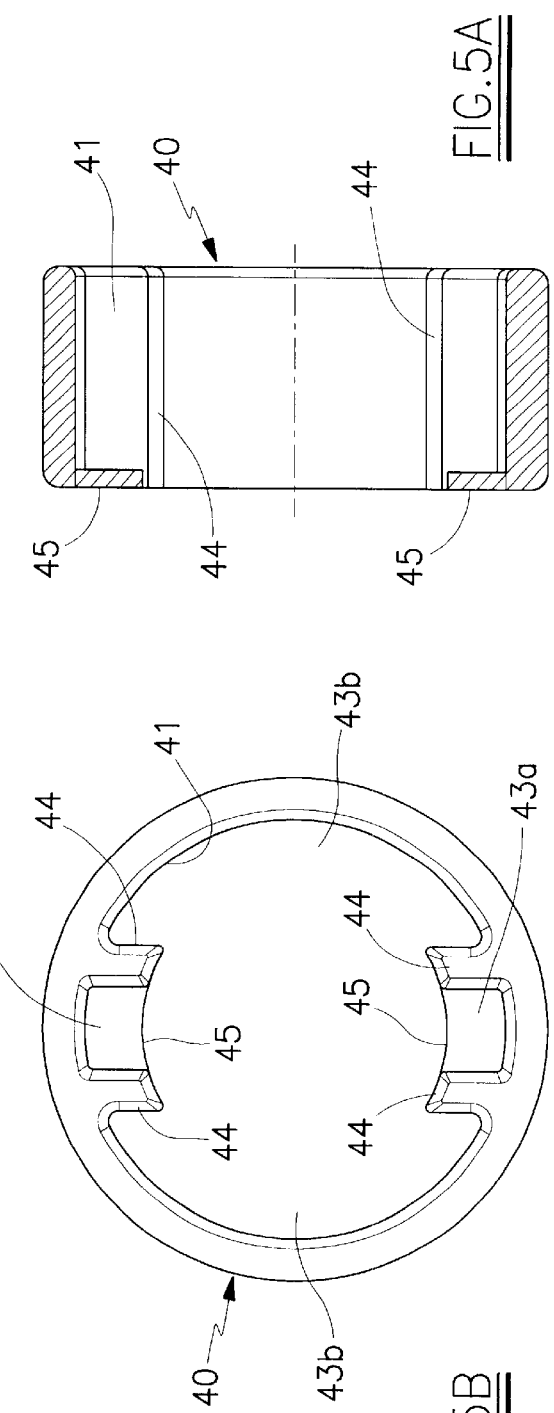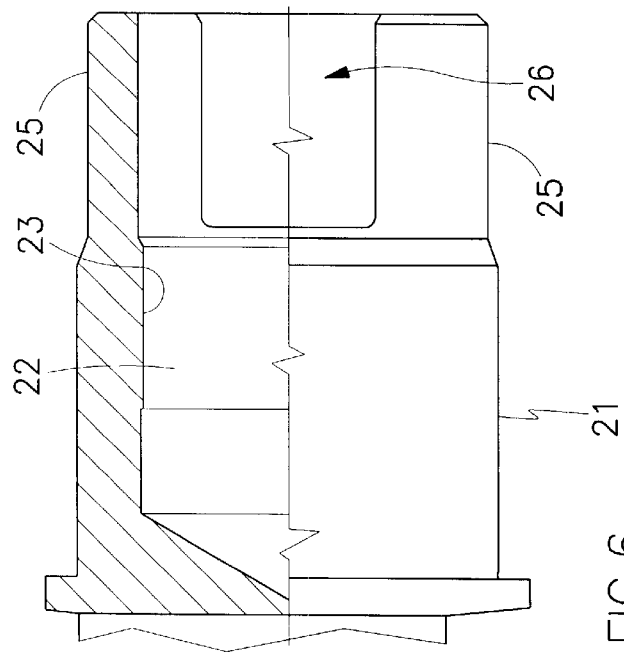

COUPLING MEANS BETWEEN A THERMAL MOTOR SHAFT AND A RECIPROCATING PUMP SHAFT

This invention relates to coupling means between a thermal motor shaft and a reciprocating pump shaft.

Thermal motors are known and widely available, they being typically intended to be coupled to electrical generators, the motor shaft of which has at its end a frusto-conical surface for coupling to that member of the generator which is to be rotated; coupling is achieved by axially forcing together the frustoconical surface of the shaft and a corresponding surface of the rotary member, in particular by means of a screw, the shank of which is engaged in an axial hole provided at the shaft end to axially force the rotary member against the shaft.

Reciprocating pumps are also known, particularly for water, their shaft presenting at the coupling end a cylindrical axial cavity adapted to receive as an exact fit the cylindrical end of a motor shaft; the motor and pump are connected together by a connection flange, the two shafts being obliged to rotate together by keys interposed between the coupled surfaces of the two shafts and inserted into appropriate recesses.

The aforestated thermal motor shafts cannot however be coupled to said reciprocating pumps. However, for of those firms which market these pumps it would be advantageous to be able to couple them to said thermal motors, both because these are widely available and because this extends in the facility for using such motors, examples of which are often held in stock.

An object of the present invention is therefore to make it possible to couple the shaft of said thermal motors to the shaft of said reciprocating pumps, using coupling means of small overall size and simple construction.

This and further objects are attained by the invention as characterised in the claims.

The invention is described in detail hereinafter with the aid of the accompanying figures which show one embodiment thereof by way of non-limiting example.

FIG. 2 is an enlarged detail of FIG. 1, sectioned on the plane II—II of FIG. 3.

FIG. 3 is a section on the plane III—III of FIG. 2.

FIGS. 4A and 4B show an axial section and respectively a front view of the intermediate sleeve of FIG. 1.

FIGS. 5A and 5B show an axial section and respectively a front view of the intermediate ring of FIG. 1.

FIG. 6 is a side view, partly in axial section, of the end of the pump shaft of FIG. 1.

Figure 1:
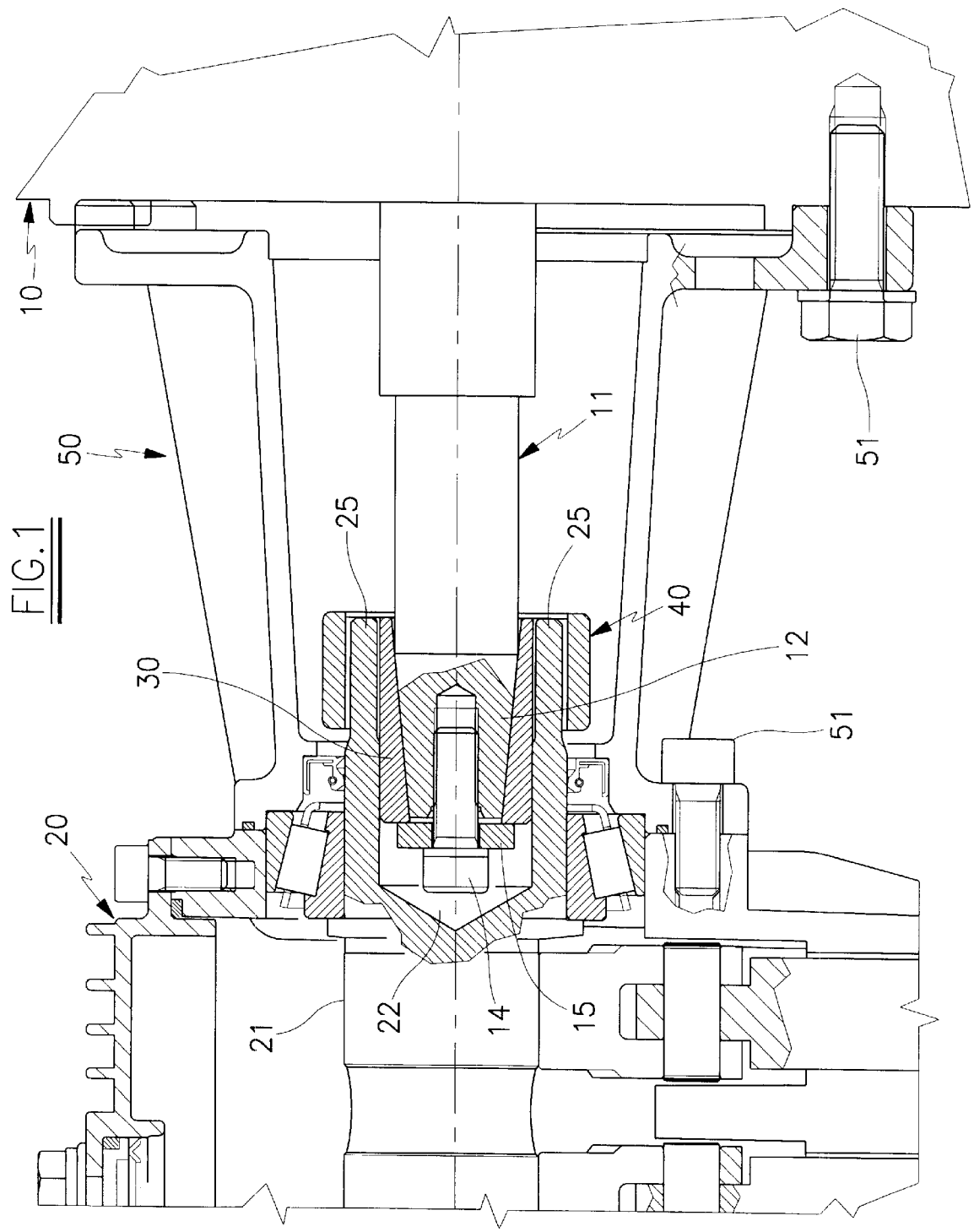
FIG. 1 is an axial section through a coupling between a thermal motor shaft and a reciprocating pump shaft, using the means of the invention.

In FIG. 1 the reference numeral 10 indicates overall a thermal motor, of known type, of which only a portion is shown, and which possesses a shaft 11, of which that portion protecting to the outside is visible. The end of the motor shaft 11 possesses a frusto-conical outer surface 12.

The reference numeral 20 indicates overall a reciprocating pump of known type, of which only a portion is shown, and which possesses a shaft 21, of which that end portion to be coupled to the motor shaft 11 is visible.

According to the invention, an intermediate sleeve 30 is provided having a through inner cavity, the surface 32 of which is frusto-conical, to fit the frusto-conical surface 12 of the motor shaft 11. The sleeve 30 also comprises a cylindrical outer surface 31 and, to the side thereof, a rear surface carrying at least one rib 33 protecting radially from the outer surface 31 and extending in an axial plane, it being of constant outer diameter and having its axial length limited to the rear surface of the sleeve 30. Preferably two diametrically opposing ribs 33 are provided, positioned 180 degrees apart. In the figures, the ribs 33 have an axial length approximately equal to one half the axial length of the sleeve.

The sleeve 30 is rigidly fixed to the end of the motor shaft 11 by a screw 14, which engages in a dead axial hole 13 provided in the shaft 11; the head of the screw 14 engages a holed plate 15 which presses against the flat end face 30' of the sleeve 30 and consequently axially forces the sleeve 30 against the motor shaft 11 to hence connect them rigidly together.

The end of the pump shaft 21 possesses a dead axial cavity 22 which opens to the outside and has a cylindrical surface 23 adapted to engage as an exact fit the outer cylindrical surface 31 of the sleeve 30. In addition the end of the shaft 21 also possesses at least one axial element 25 projecting axially from the cylindrical surface 23, and in particular two axial elements 25, arranged to lie axially alongside the ribs 33 of the intermediate sleeve 30, and to interfere with these during rotation, so that the shaft 11 drags the shaft 21 with it into rotation.

Preferably, between the axial elements 25 and the ribs 33 there is interposed an intermediate ring 40 of resilient material, which fits onto that axial portion of the sleeve 30 involving the ribs 33 and has an annular cavity 41 which externally surrounds the sleeve and is divided into at least two respective sectors 43a and 43b separated by radial baffles 44.

In particular, in the preferred embodiment shown in the figures, said annular cavity 41 is divided into four sectors 43a and 43b, in the form of opposing pairs, by four baffles 44 extending in two parallel planes; the first two sectors 43a are arranged to receive the sleeve ribs 33 as an exact fit.

The ring 40 possesses two thin transverse walls 45 defining two end walls which close one of the axial ends of the two sectors 43a and prevent the intermediate ring from moving axially.

The axial elements 25, projecting axially from the end of the shaft 21, can be inserted virtually as an exact fit, with slight radial slack, into the two opposing sectors 43b of the annular cavity of the intermediate ring 40.

In particular, the two projecting elements 25 are in the form of tube portions, separated by two axial slots 26 formed by milling along an axial plane.

In use, the sleeve 30 is applied to the end of the motor shaft 11 and rigidly connected thereto by the screw 14 and the plate 15. The intermediate ring 40 is then applied to the sleeve 30 by inserting the ribs 33 into the sectors 43a, and with the walls 45 positioned close to the outer surface 31, in other words closer to the final end of the shaft 11.

The motor shaft 11 is then inserted in an axial direction into the cavity 22, such that the inner surface 23 of the cavity 22 engages the outer surface 31 of the sleeve 30 as an exact fit; the axial elements 25 are simultaneously inserted into the corresponding sectors 43b.

The pump 20 and the motor 10 are also connected rigidly together by a usual bell flange 50, fixed to these machines by usual screws 51.

Hence by virtue of the described coupling means, the two shafts 11 and 21 are disposed coaxially to each other because of the centering achieved by the exact engagement between the two surfaces 31 and 23, the drive torque being transmitted by the reaction between the ribs 33 at the axial elements 25, between which the radial baffles 44 of the ring

40 are interposed. As the baffles 44 are of resilient material, the ring 40 behaves as an elastic coupling.

The intermediate ring 40 could be dispensed with, in which case the axial elements 25 are in direct contact with the ribs 33. However the presence of the ring 40 is preferable, both because it makes the drive contact between the two shafts softer, and because it also serves to protect the parts covered thereby from corrosion and oxidation.

Numerous modifications of a practical and applicational nature can be made to the invention, but without departing from the scope of the inventive idea as claimed below.

What is claimed is:

1. Coupling means between a thermal motor shaft and a reciprocating pump shaft, in which the end of the motor shaft (11) has a frusto-conical surface (12), characterised by comprising:

an intermediate sleeve (30), having an inner surface (32) of frusto-conical shape adapted to fit the frusto-conical surface (12) of the motor shaft (11), and a cylindrical outer surface (31), and having at least one rib (33), projecting radially from the cylindrical outer surface (31) and positioned to the side thereof;

said sleeve (30) being arranged to be rigidly connected to the end of the motor shaft (11);

the end of the pump shaft (21) possessing an axial cavity (22) having a cylindrical surface (23) adapted to engage as an exact fit the outer surface (31) of the sleeve (30), and having at least one protecting axial element (25), arranged to lie axially alongside said rib (33) of the intermediate sleeve (30), and to interfere therewith during rotation.

2. Coupling means as claimed in claim 1, characterised by comprising an intermediate ring (40), which fits onto that axial portion of the sleeve (30) involving said rib (33) and has an annular cavity which surrounds the outer surface of the sleeve (30) and is divided into at least two separate sectors (43a, 43b) by radial baffles (44), of which a first sector (43a) is arranged to receive said rib (33) of the sleeve (30) as an exact fit; said axial element (25) which projects from the end of the pump shaft (21) being adapted to be inserted as an exact fit into the second (43b) of said sectors of the annular cavity of the intermediate ring (40).

3. Coupling means as claimed in claim 2, characterised in that:

the annular cavity of said intermediate ring (40) is divided into four sectors (43a, 43b), in the form of opposing pairs; the intermediate sleeve (30) comprises two radially projecting ribs (33) positioned 180 degrees apart, to be inserted into two opposing sectors (43a);

the end of the pump shaft (21) has a pair of projecting axial elements (25) positioned 180 degrees apart, to be inserted into the two remaining opposing sectors (43b).

4. Coupling means as claimed in claim 2, characterised in that the intermediate sleeve (30) is rigidly fixed to the end of the motor shaft by a screw (14), applied to an axial hole (13) provided in the shaft (11) and arranged to axially force the sleeve (30) against the shaft (11).

* * * * *